United States Patent
Rathnamaiah et al.

(10) Patent No.: US 10,644,985 B1
(45) Date of Patent: May 5, 2020

(54) DEVICE-CONTAINED DATA PLANE VALIDATION

(71) Applicant: Juniper Networks, Inc., Sunnyvale, CA (US)

(72) Inventors: Sharath Kumar Kota Rathnamaiah, Bangalore (IN); Sudheendra Gopinath, Bangalore (IN); Sudipto Nandi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 15/280,572

(22) Filed: Sep. 29, 2016

(51) Int. Cl.
*H04L 12/26* (2006.01)
*H04L 29/06* (2006.01)

(52) U.S. Cl.
CPC .............. *H04L 43/50* (2013.01); *H04L 67/42* (2013.01); *H04L 69/16* (2013.01)

(58) Field of Classification Search
CPC .......... H04L 43/50; H04L 67/42; H04L 69/16
See application file for complete search history.

(56) References Cited

U.S. PATENT DOCUMENTS

| | | | |
|---|---|---|---|
| 7,463,591 B1 | 12/2008 | Kompella et al. | |
| 7,957,304 B2 | 6/2011 | Kalbag | |
| 8,588,082 B2 | 11/2013 | Gintis et al. | |
| 2006/0285501 A1 | 12/2006 | Damm | |
| 2009/0285089 A1 | 11/2009 | Srinivasan | |
| 2010/0110906 A1* | 5/2010 | Ram | H04L 43/50 370/252 |
| 2011/0188386 A1* | 8/2011 | Nicholson | H04L 43/00 370/252 |
| 2012/0170585 A1* | 7/2012 | Mehra | H04L 45/24 370/400 |
| 2014/0119203 A1* | 5/2014 | Sundaram | H04L 43/10 370/250 |
| 2015/0261635 A1 | 9/2015 | Hayes | |
| 2017/0093665 A1* | 3/2017 | Armstrong | H04L 43/022 |

(Continued)

FOREIGN PATENT DOCUMENTS

EP 2654241 A1 11/2011

OTHER PUBLICATIONS

Wikipedia, "Forwarding plane," https://en.wikipedia.org/wiki/Forwarding_plane, Apr. 14, 2016, 5 pages.

(Continued)

*Primary Examiner* — Mandish K Randhawa
(74) *Attorney, Agent, or Firm* — Harrity & Harrity, LLP

(57) ABSTRACT

A device may configure a state of a data plane to test the state of the data plane using a set of components. The device may provide a set of packets from a first virtual component of the device to a first port of the device. The first virtual component may include a first virtual representation of a first device. The first virtual component may be included in the set of components. The device may loop back the set of packets at the first port of the device based on providing the set of packets to the first port. The device may perform an action based on the state of the data plane in association with looping back the set of packets at the first port. The device may determine whether a test of the state of the data plane is associated with a pass status or a fail status.

20 Claims, 7 Drawing Sheets

(56) References Cited

U.S. PATENT DOCUMENTS

2017/0366442 A1* 12/2017 Marelli .................. H04L 43/50

OTHER PUBLICATIONS

GitHub, "OpenFlow Switch Test Framework," https://github.com/floodlight/oftest, Dec. 12, 2014, 5 pages.
GitHub, "p4lang/switch," https://github.com/p4lang/switch/tree/master/tests/ptf-tests/sai-tests, Oct. 15, 2015, 2 pages.
Cavium, "XPliant Ethernet Switch Product Family," http://www.cavium.com/XPliant-Ethernet-Switch-Product-Family.html, Sep. 16, 2014, 2 pages.
Broadcom, "Eight-Port GbE Switch With Eight Integrated PHYs and LoopDTech," http://www.broadcom.com/products/Enterprise-Networking/Gigabit-Ethernet-Switching-Products/BCM5398, Nov. 8, 2005, 4 pages.
Safari, "Appendix A. Under the Hood," https://www.safaribooksonline.com/library/view/juniper-qfx5100-series/9781491949566/app01.html, Nov. 23, 2014, 3 pages.
AMD, "AMD A-Series Chipsets," http://www.amd.com/en-us/products/chipsets/a-series, Aug. 27, 2014, 2 pages.
Packet Pushers, "List of Merchant Silicon Manufacturers and Chips," Sep. 15, 2015, 8 pages.

* cited by examiner

US 10,644,985 B1

DEVICE-CONTAINED DATA PLANE VALIDATION

BACKGROUND

A data plane (sometimes referred to as a forwarding plane) may define a portion of a network device architecture that determines a course of action for packets arriving to the network device on an inbound interface. In some cases, a data plane may include a data structure or table used by a network device to look up a destination address (e.g., an Internet protocol (IP) address) associated with an incoming packet. Additionally, the network device may use the data plane to look up information needed to determine a path from the network device to another network device. Conversely, in some cases, the data plane may indicate that a packet is to be discarded.

SUMMARY

According to some possible implementations, a device may include one or more processors to receive an instruction to configure a state of a data plane to test the state of the data plane using a set of components of the device. The one or more processors may provide a set of packets from a first virtual component of the device to a first port of the device. The first virtual component may include a first virtual representation of a first device. The first virtual component may be included in the set of components. The one or more processors may loop back the set of packets at the first port of the device based on providing the set of packets to the first port. The one or more processors may perform an action based on the state of the data plane in association with looping back the set of packets at the first port. The one or more processors may determine whether a test of the state of the data plane is associated with a pass status or a fail status.

According to some possible implementations, a non-transitory computer-readable medium may store one or more instructions that, when executed by one or more processors, cause the one or more processors to receive, from a client device, an instruction to configure a state of a data plane. The state of the data plane may be tested using components of a network device. The one or more instructions may cause the one or more processors to provide a packet from a traffic generator to a first port of the network device. The traffic generator may include a virtual component of the network device. The first port of the network device may represent an ingress port of the network device. The one or more instructions may cause the one or more processors to loop back the packet at the first port to emulate ingress of the packet into the network device. The one or more instructions may cause the one or more processors to provide the packet toward a second port of the network device to emulate egress of the packet from the network device. The second port of the network device may represent an egress port of the network device. The one or more instructions may cause the one or more processors to loop back the packet at the second port. The one or more instructions may cause the one or more processors to provide the packet to a virtual machine executing on the network device. The virtual machine may include another virtual component of the network device. The one or more instructions may cause the one or more processors to determine whether a test of the data plane is associated with a pass status or a fail status based on providing the packet to the virtual machine.

According to some possible implementations, a method may include receiving, by a device, an instruction to configure a state of a data plane of the device. The state of the data plane may be tested by the device using components of the device. The method may include providing, by the device, a set of packets from a traffic generator executing on the device to an ingress port of the device. The method may include using, by the device, a first loopback to loop back the set of packets at the ingress port. The method may include generating, by the device, multiple packets from the set of packets using a port mirror associated with the ingress port. The method may include providing, by the device, the multiple packets to an egress port of the device. The method may include using, by the device, a second loopback to loop back the multiple packets at the egress port. The method may include providing, by the device, the multiple packets to a virtual machine executing on the device. The method may include determining, by the device, whether a test of the data plane is associated with a pass status or a fail status based on providing the multiple packets to the virtual machine.

DETAILED DESCRIPTION

The following detailed description of example implementations refers to the accompanying drawings. The same reference numbers in different drawings may identify the same or similar elements.

A network administrator may want to validate (e.g., qualify) a data plane of a network device, such as a set of features of the data plane, as part of quality assurance. To validate the data plane, the network administrator may need to use devices physically connected to the network device, such as a traffic generator, a peer network device, optical transceivers, or similar types of devices. The need for inter-operability between the devices used to validate the data plane (e.g., inter-operability between vendor software), the need for software to manage the validation of the data plane, and/or the need to obtain and configure physical devices may make it difficult to validate a data plane of a network device.

Implementations described herein, enable a network device to perform device-contained data plane validation (e.g., without being physically connected to other devices that would need to be used to validate the data plane). This reduces or eliminates a need for external devices to be connected to the network device during data plane validation, such as an external traffic generator, a peer network device, an optical transceiver, and/or the like. Reducing or eliminating the need for external devices to be connected to the network device conserves processing resources that would otherwise be used as a result of inter-operability issues between the network device and the external devices. In addition, this increases an efficiency of orchestrating a test of a data plane, thereby conserving processing resources associated with validating the data plane. Further, this conserves resources related to network infrastructure, by reducing or eliminating the need for a network administrator to configure a physical network topology to test the data plane of a network device.

In addition, implementations described herein may enable the network device to determine, or set, a state for a data plane, such as a state to be used for a data plane test. Further, implementations may enable the network device to provide (e.g., inject) a packet to an ingress port and receive and validate traffic on a set of egress ports of the network device. Further still, the network device may generate traffic at a line rate, provide the traffic to a port of the network device, and/or validate the traffic received on a set of egress ports of the network device. This enables the network device to validate different features of a data plane of the network device using a single packet test and/or a multiple packet test, thereby improving validation of the data plane.

Figure 1A:
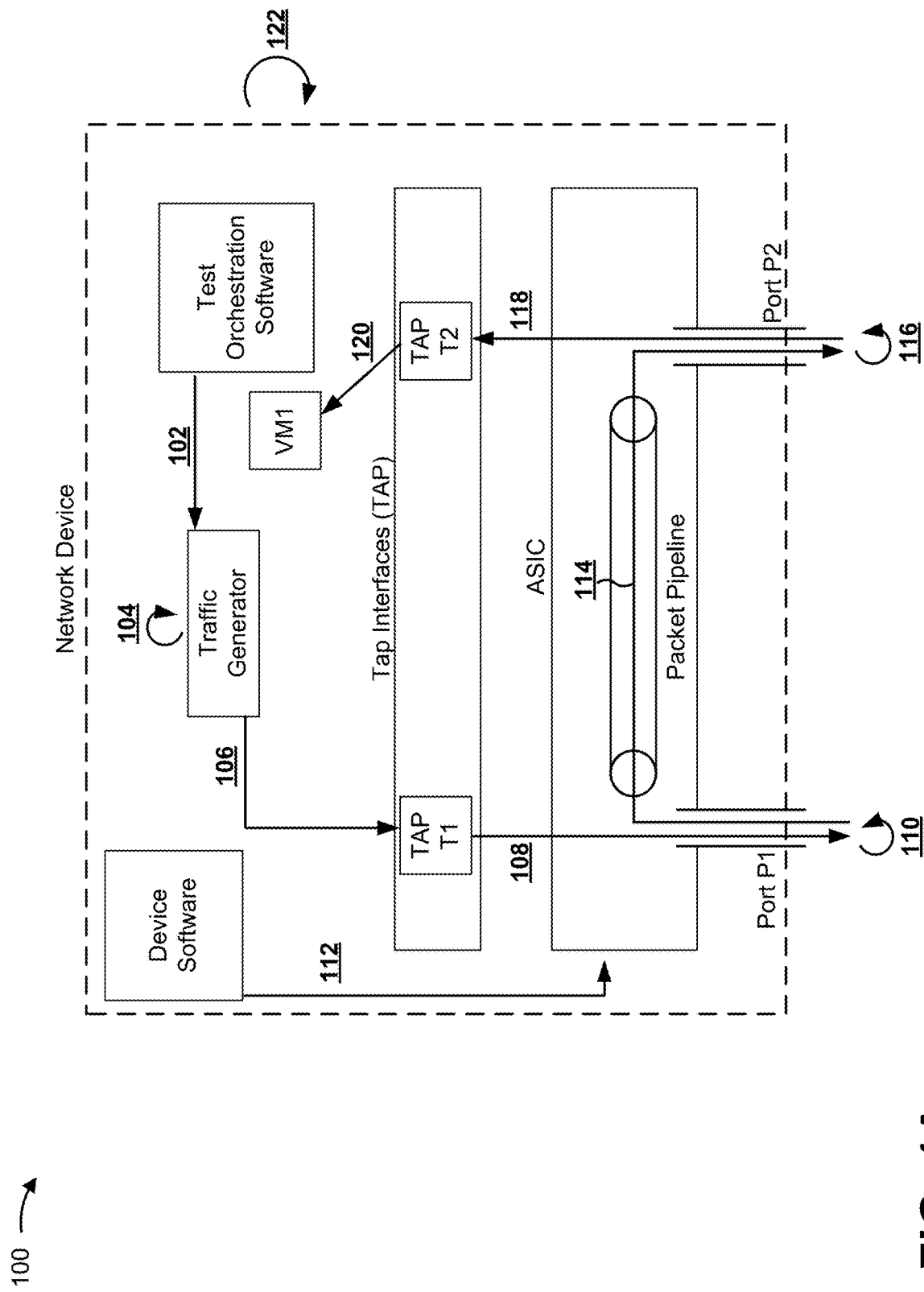
FIGS. 1A and 1B are diagrams of an overview of an example implementation described herein.
Figure 1B:
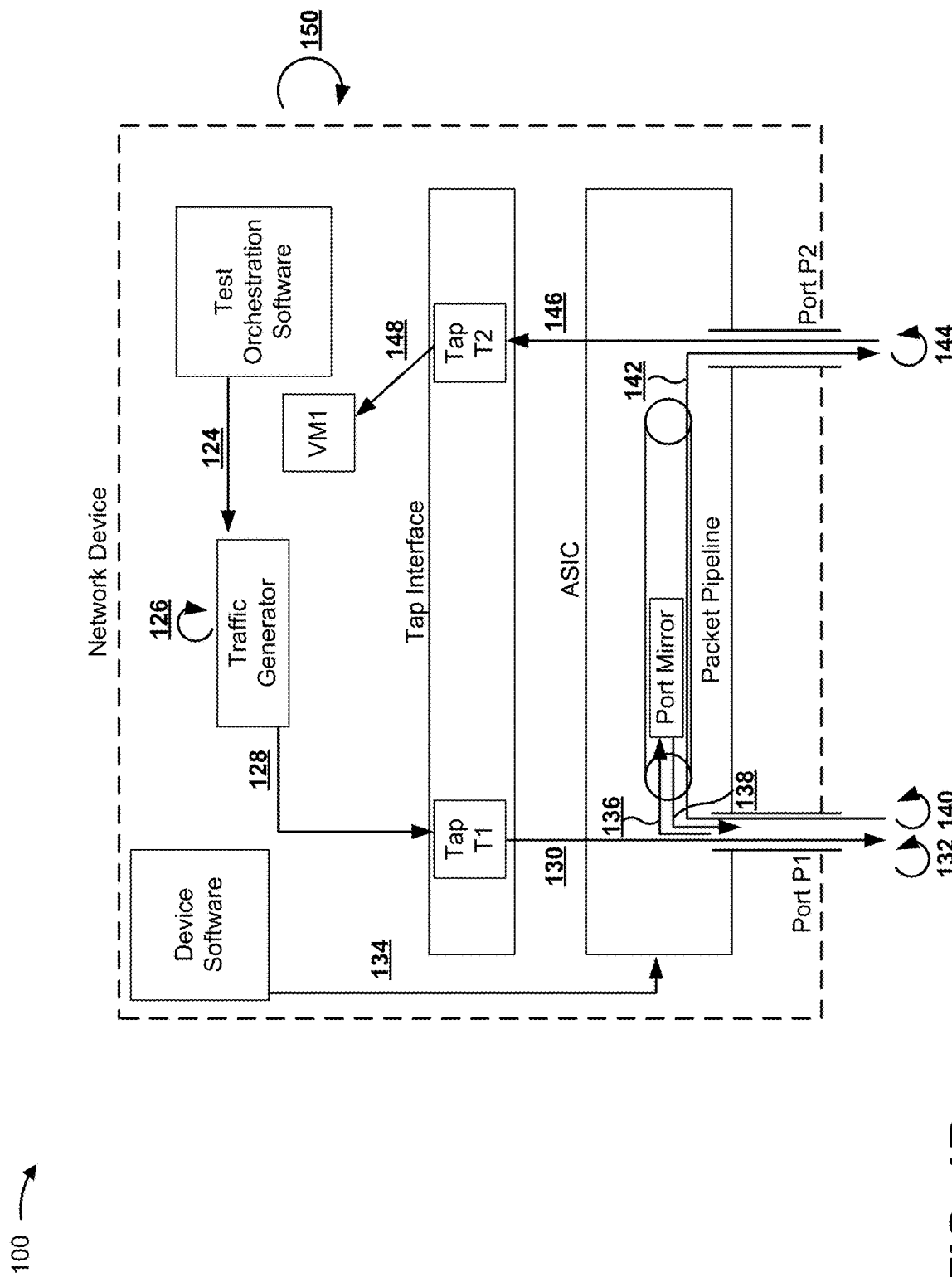

FIGS. 1A and 1B are diagrams of an overview of an example implementation 100 described herein. FIGS. 1A and 1B show a network device performing device-contained data plane validation. In some implementations, the network device may include one or more components (e.g., virtual and/or physical components), such as a traffic generator, test orchestration software, a virtual machine VM1, tap interfaces (tap) T1 and T2, an application-specific integrated circuit (ASIC), ports P1 and P2, and a packet pipeline between ports P1 and P2. FIG. 1A shows device-contained data plane validation using a single packet.

As shown in FIG. 1A, and by reference number 102, the network device may use the test orchestration software to provide instructions to the traffic generator to generate a packet. As shown by reference number 104, the traffic generator may generate a packet (e.g., a packet configured to test a set of features of a data plane of the network device) based on receiving the instructions from the test orchestration software. As shown by reference number 106, the traffic generator may provide the packet to tap T1.

As further shown in FIG. 1A, and by reference number 108, the network device may provide the packet from tap T1 to port P1. For example, the network device may provide the packet to port P1 via the ASIC, and/or a central processing unit (CPU) port of the ASIC, and using a transmission bypass inject. As shown by reference number 110, the network device may use a loopback to loop back the packet at port P1, such as to emulate reception of the packet by the network device from another device. As shown by reference number 112, device software related to the network device may cause the network device to handle (e.g., forward, drop, trap, etc.) the packet that is being received via port P1. For example, the device software may cause the network device to handle the packet by providing instructions to the ASIC, programming forwarding tables of the ASIC, and/or the like to cause the network device to handle the packet in a particular manner.

As shown by reference number 114, the network device may provide the packet from port P1 to port P2 via a packet pipeline between ports P1 and P2. For example, the network device may provide the packet from port P1 to port P2 to emulate transmission of the packet from the network device (e.g., according to a state of the data plane).

As further shown in FIG. 1A, and by reference number 116, the network device may use a loopback to loop back the packet at port P2. For example, the network device may loop back the packet to provide the packet to virtual machine VM1 of the network device, thereby reducing or eliminating the need for the network device to be physically connected to another device. As shown by reference number 118, the network device may provide the packet from port P2 to tap T2. In some implementations, the network device may provide the packet from port P2 to tap T2 via a central processing unit (CPU) port associated with the ASIC.

As shown by reference number 120, tap T2 may provide the packet to virtual machine VM1 (e.g., according to the set of features of the data plane). In some implementations, the network device may provide the packet from tap T2 to the device software, which may provide the packet to virtual machine VM1 (e.g., rather than providing the packet directly from tap T2 to virtual machine VM1). As shown by reference number 122, the network device may validate the data plane (e.g., by determining whether the packet was delivered to the correct destination, properly filtered, etc.).

FIG. 1B shows device-contained data plane validation using multiple packets. As shown in FIG. 1B, and by reference number 124, the network device may use test orchestration software to provide instructions to a traffic generator to generate a set of packets. As shown by reference number 126, the traffic generator may generate a set of packets based on receiving the instructions from the test orchestration software. As shown by reference number 128, the traffic generator may provide the set of packets to tap T1, thereby emulating transmission of the set of packets from the traffic generator.

As shown by reference number 130, the network device may provide the set of packets from tap T1 to port P1. For example, the network device may provide the set of packets from tap T1 to port P1 in a manner similar to that described above. As shown by reference number 132, the network device may use a loopback configured on port P1 to loop back the packet at port P1. As shown by reference number 134, device software related to the network device may cause the network device to handle (e.g., forward, drop, trap, etc.) the packet that is being received via port P1. For example, the device software may provide instructions to the ASIC, program a forwarding table of the ASIC, and/or the like to cause the network device to handle the set of packets in a particular manner.

As shown by reference number 136, the network device may provide the set of packets from port P1 to a port mirror. As show by reference number 138, the port mirror may provide a copy of the set of packets (e.g., a set of mirrored packets) back to port P1. As shown by reference number 140, the network device may use the loopback configured on port P1 to loop back the set of mirrored packets at port P1. The network device may use this mirroring technique to generate multiple packets until, for example, a particular, or threshold, line rate of packets is generated. This enables the network device to validate a state (e.g., a set of features) of the data plane of the network device that relates to a line rate of packets.

As shown by reference number 142, the network device may provide multiple packets (e.g., the set of packets and/or the set of mirrored packets) to port P2. As shown by reference number 144, the network device may use a loopback configured on port P2 to loop back the multiple packets at port P2. As shown by reference number 146, the network device may provide the multiple packets from port P2 to tap T2 (e.g., to emulate the network device providing the multiple packets to an external device). In some implementations, the network device may provide the multiple packets from port P2 to tap T2 via a CPU port associated with the ASIC.

As shown by reference number 148, the network device may provide the multiple packets from tap T2 to virtual machine VM1 (e.g., virtually representing a device that would be physically connected to the network device during validation of a data plane). In some implementations, the network device may provide the multiple packets from tap T2 to the device software, which may provide the multiple packets to virtual machine VM1. As shown by reference number 150, the network device may determine a result of validating the data plane (e.g., by determining whether the network device handled the multiple packets according to a state of the data plane of the network device).

In this way, a network device may perform device-contained data plane validation (e.g., without being physically connected to other devices that would need to be used to validate the data plane). This reduces or eliminates a need for external devices to be connected to the network device during data plane validation, such as an external traffic generator, a peer network device, an optical transceiver, and/or the like. Reducing or eliminating the need for external devices to be connected to the network device conserves processing resources that would otherwise be used as a result of inter-operability issues between the network device and the external devices. In addition, this increases an efficiency of orchestrating a test of a data plane, thereby conserving processing resources associated with validating the data plane.

As indicated above FIGS. 1A and 1B are provided merely as an example. Other examples are possible and may differ from what was described with regard to FIGS. 1A and 1B. For example, while FIGS. 1A and 1B show validation of traffic sent to a particular destination, other examples may include validation of dropping a packet, trapping a packet, performing an action based on the packet, and/or the like (e.g., rather than providing a packet to a destination).

Figure 2:
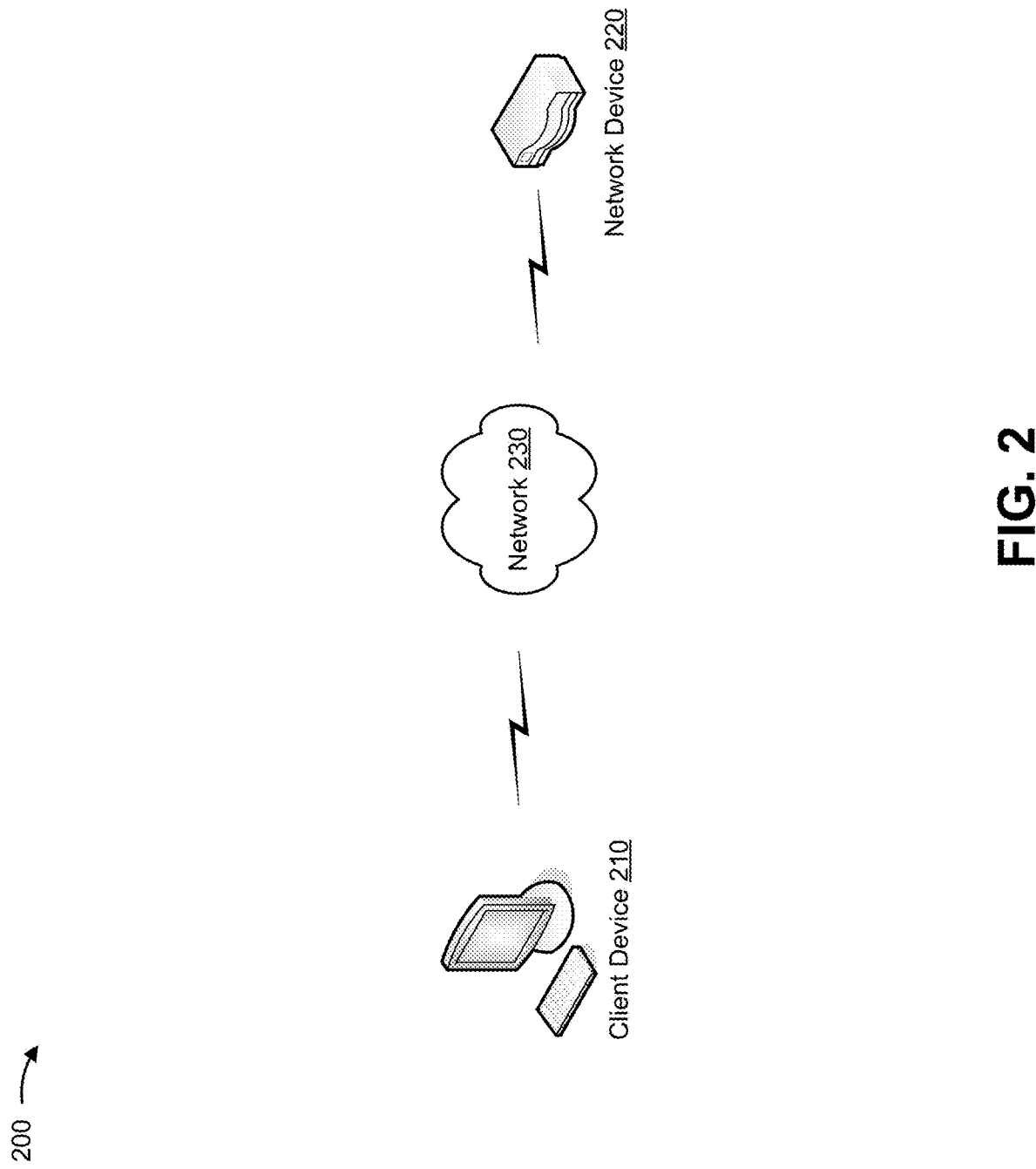
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network device 220, and a network 230. Devices of environment 200 may interconnect via wired connections, wireless connections, or a combination of wired and wireless connections.

Client device 210 includes one or more devices capable of receiving, generating, storing, processing, and/or providing information associated with a test related to validation of a data plane of network device 220. For example, client device 210 may include a communication and/or computing device, such as a desktop computer, a laptop computer, a tablet computer, a server device (e.g., in a data center or in a cloud computing environment), a mobile phone (e.g., a smart phone or a radiotelephone), a gaming device, a wearable communication device (e.g., a smart wristwatch, a pair of smart eyeglasses, or a smart activity band), or a similar type of device. In some implementations, client device 210 may provide information related to a test of a data plane of network device 220, as described elsewhere herein. Additionally, or alternatively, client device 210 may receive information related to a result of a test of a data plane of network device 220, as described elsewhere herein.

Network device 220 includes one or more devices capable of receiving, storing, generating, and/or processing information, such as information related to performing device-contained data plane validation. For example, network device 220 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. In some implementations, network device 220 may perform device-contained data plane validation, as described elsewhere herein. Additionally, or alternatively, network device 220 may determine a result of performing device-contained data plane validation, as described elsewhere herein.

Network 230 includes one or more wired and/or wireless networks. For example, network 230 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
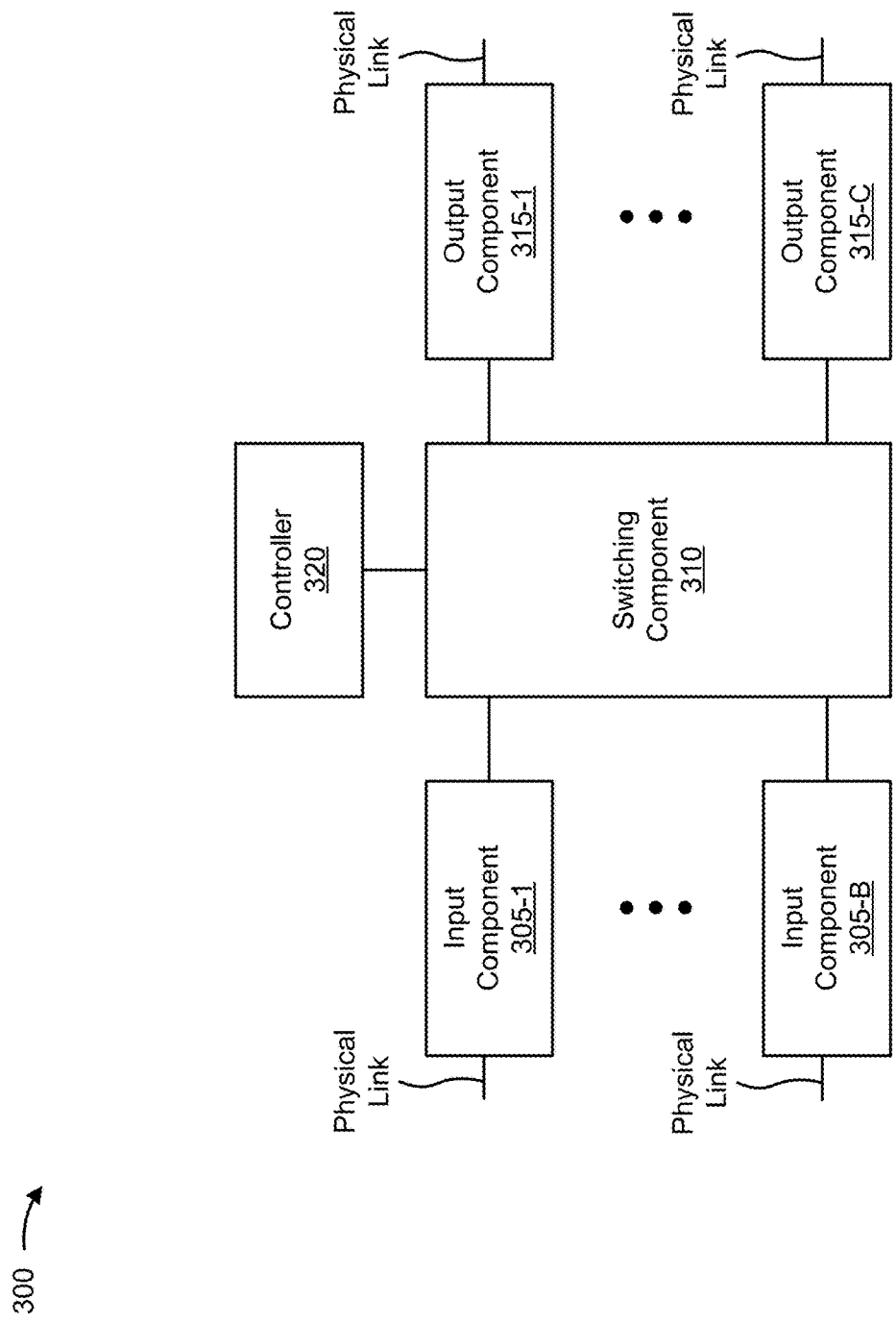
FIG. 3 is a diagram of example components of one or more devices of FIG. 2.

FIG. 3 is a diagram of example components of a device 300. Device 300 may correspond to client device 210 and/or network device 220. In some implementations, client device 210 and/or network device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, or an optical memory) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
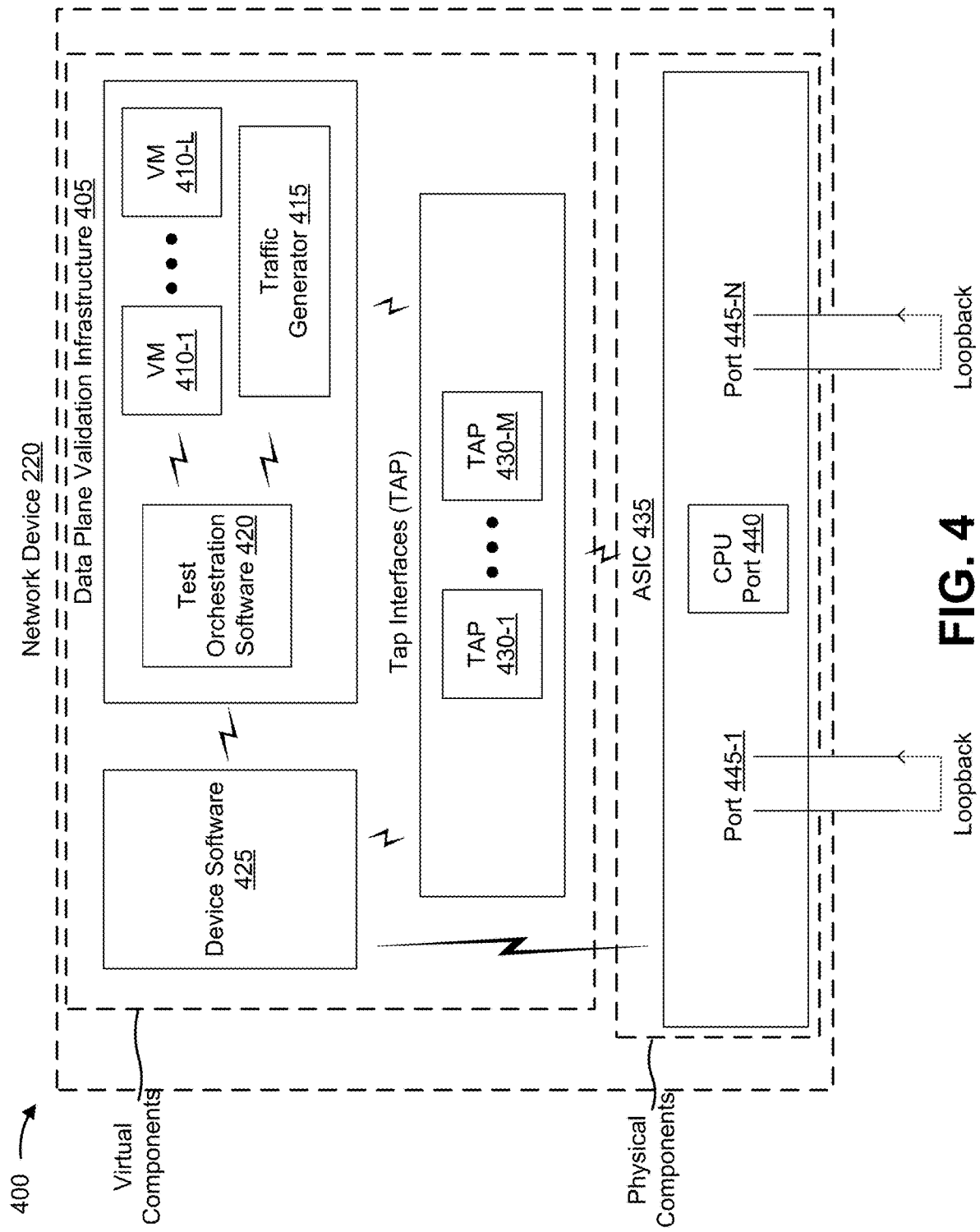
FIG. 4 is a diagram of example components of a network device.

FIG. 4 is a diagram of example components of a device 400. Device 400 may correspond to network device 220. In some implementations, network device 220 may include one or more devices 400 and/or one or more components of device 400. In some implementations, device 400 may include virtual components and/or physical components. As shown in FIG. 4, device 400 may include a data plane validation infrastructure 405 that includes one or more virtual machines (VMs) 410-1 through 410-L (L≥1) (hereinafter referred to collectively as "VMs 410," and individually as "VM 410"), a traffic generator 415, and test orchestration software 420, and device software 425. In addition, as shown in FIG. 4, device 400 may include one or more tap interfaces (tap) 430-1 through 430-M (M≥1) (herein after referred to collectively as "taps 430," and individually as "tap 430"), an ASIC 435, a CPU port 440, and one or more ports 445-1 through 445-N(N≥1) (hereinafter referred to collectively as "ports 445," and individually as "port 445").

Data plane validation infrastructure 405 includes one or more virtual components capable of replicating physical components used to perform a test related to validation of a data plane. For example, data plane validation infrastructure 405 may include a software implementation of a device, such as a device that would be physically connected to network device 220 during data plane validation, as described elsewhere herein. In some implementations, data plane validation infrastructure 405 may include VMs 410-1 through 410-L, a traffic generator 415, and test orchestration software 420.

VM 410 includes a software implementation of a machine (e.g., network device 220 or a computer) that executes programs like a physical machine. VM 410 may be either a system virtual machine or a process virtual machine, depending upon use and degree of correspondence to any real machine by VM 410. A system virtual machine may provide a complete system platform that supports execution of a complete operating system ("OS"). A process virtual machine may execute a single program, and may support a single process. In some implementations, VM 410 may include a software implementation of a peer network device 220 that would be physically connected to network device 220 during data plane validation, as described elsewhere herein. Additionally, or alternatively, VM 410 may receive packets during device-contained data plane validation (e.g., packets generated by traffic generator 415), as described elsewhere herein.

Traffic generator 415 includes one or more virtual components capable of generating traffic (e.g., one or more packets). For example, traffic generator 415 may include a software implementation of a traffic generator, such as a multiprotocol traffic generator, that performs like a physical machine. In some implementations, traffic generator 415 may generate one or more packets, as described elsewhere herein. Additionally, or alternatively, traffic generator 415 may provide a generated packet to another component, such as tap 430, as described elsewhere herein.

Test orchestration software 420 includes one or more virtual components capable of arranging, coordinating, and/or managing a test related to validation of a data plane. In some implementations, test orchestration software 420 may provide information identifying a state (e.g., a configuration state to be tested) to device software 425 and/or VM 410, as described elsewhere herein. Additionally, or alternatively, test orchestration software 420 may cause traffic generator 415 to provide and/or receive a packet from tap 430, as described elsewhere herein. Additionally, or alternatively, test orchestration software 420 may determine a result of a test (e.g., validate a data plane of network device 220), as described elsewhere herein.

Device software 425 includes one or more virtual components capable of managing hardware and/or software resources of network device 220 and/or providing a service for a computer program. For example, device software 425 may include an operating system of network device 220, such as an operating system capable of performing routing, switching, filtering, and/or security functions related to a packet received by network device 220 and/or a packet generated by traffic generator 415, as described elsewhere herein. Additionally, or alternatively, device software 425 may be configured with, or to implement, a state of a data plane (e.g., a state that is being validated), as described elsewhere herein.

Tap 430 includes one or more virtual components capable of providing and/or receiving a packet. For example, tap 430 may include a virtualization of a hardware port. In some implementations, tap 430 may be connected to a virtual component, or virtual interface of a virtual component, such as a virtual component of data plane validation infrastructure 405 (e.g., VM 410 or traffic generator 415), as described elsewhere herein. In some implementations, a connection between tap 430 and a virtual component may enable virtualization of a network topology needed for a test, as described elsewhere herein.

In some implementations, tap 430 may deliver (e.g., inject) a packet generated by traffic generator 415 to port 445, such as to emulate reception of the packet from a source external to network device 220, such as a test generator that would be physically connected to network device 220 during data plane validation, as described elsewhere herein. Additionally, or alternatively, tap 430 may deliver a packet from port 445 to VM 410, such as to emulate delivery of the packet from network device 220 to a peer network device 220 that would be physically connected to network device 220 during data plane validation, as described elsewhere herein.

ASIC 435 includes an integrated circuit, such as an integrated circuit customized for a particular use, rather than an integrated circuit for general purpose use. For example, ASIC 435 may include one or more components capable of being programmed for device-contained data plane validation, or a similar type of component. As another example, ASIC 435 may include a component programmed to perform a function related to device-contained data plane validation, or a similar type of component. In some implementations, ASIC 435 may receive a packet (e.g., from tap 430) and provide the packet to port 445, as described elsewhere herein. Additionally, or alternatively, ASIC 435 may provide a packet (e.g., from port 445) and provide to tap 430, as described elsewhere herein.

CPU port 440 includes one or more components capable of receiving and/or providing a packet. For example, CPU port 440 may include a port that connects tap 430 and/or device software 425 to ASIC 435. In some implementations, CPU port 440 may receive a packet from tap 430 and may provide the packet to ASIC 435, as described elsewhere herein. Additionally, or alternatively, CPU port 440 may receive a packet from ASIC 435 and may provide the packet to tap 430, as described elsewhere herein. In some implementations, CPU port 440 may receive a packet from and/or provide a packet to device software 425. Additionally, or alternatively, network device 220 may use CPU port 440 to perform a transmission bypass injection of a packet to port 445, as described elsewhere herein.

Port 445 includes one or more points of physical attachment capable of receiving a packet and/or providing a packet. For example, port 445 may include an input port (e.g., an ingress port) and/or an output port (e.g., an egress port), or a similar type of component. In some implementations, port 445 may be configured with a loopback to loop back a packet to emulate reception of the packet from another device (e.g., to emulate reception of the packet by network device 220 from a device physically connected to network device 220), as described elsewhere herein. Additionally, or alternatively, port 445 may be configured with a loopback to loop back a packet to prevent transmission of the packet, such as when network device 220 is emulating providing the packet to another device (e.g., emulating providing the packet from network device 205 to a device physically connected to network device 220), as described elsewhere herein.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
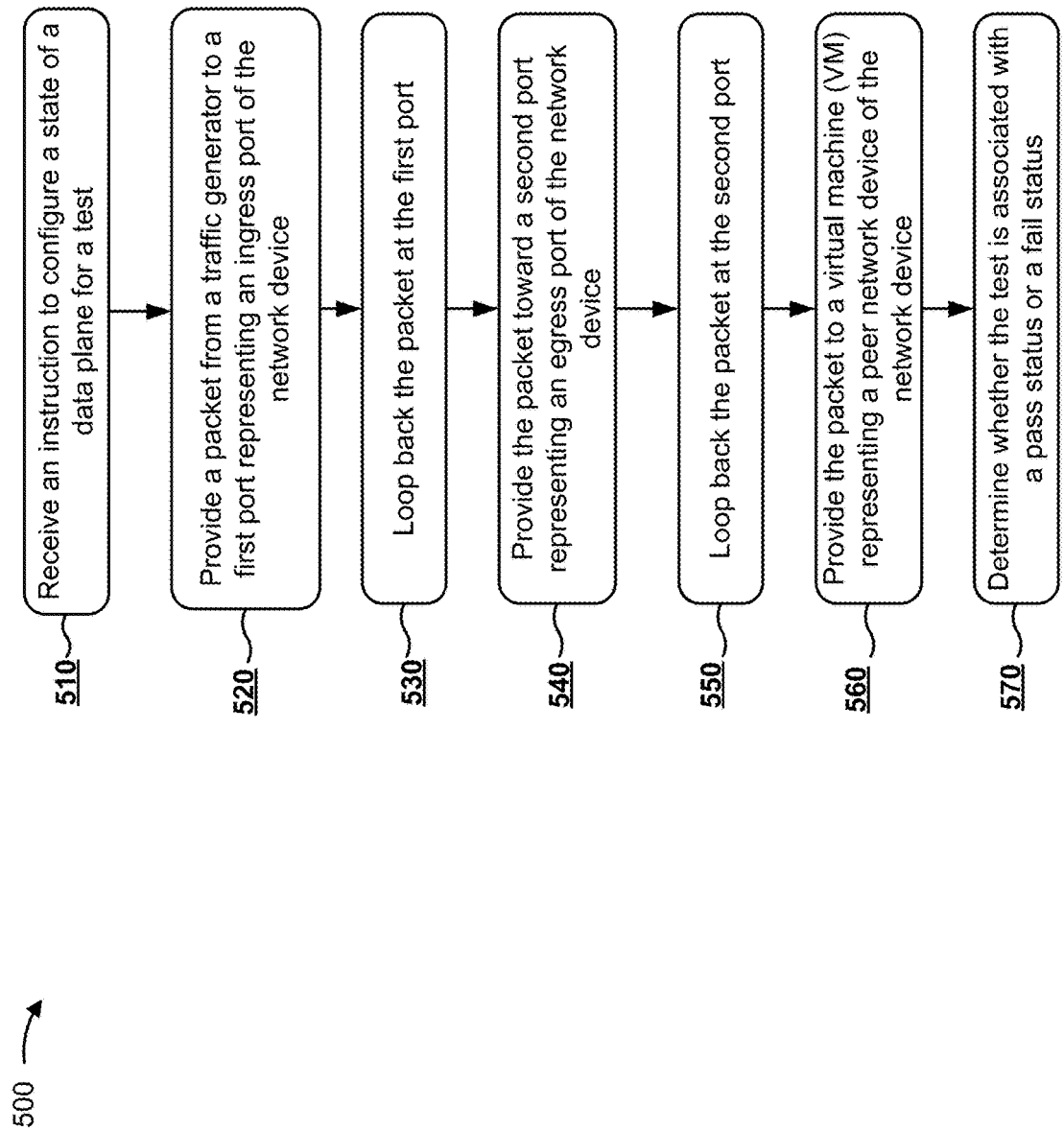
FIG. 5 is a flow chart of an example process for device-contained data plane validation using a single packet.

FIG. 5 is a flow chart of an example process 500 for device-contained data plane validation using a single packet. In some implementations, one or more process blocks of FIG. 5 may be performed by network device 220. In some implementations, one or more process blocks of FIG. 5 may be performed by another device or a group of devices separate from or including network device 220, such as client device 210.

As shown in FIG. 5, process 500 may include receiving an instruction to configure a state of a data plane for a test (block 510). For example, network device 220 may receive an instruction from client device 210, via network 230, to configure a data structure, such as a routing table, a media access control (MAC) address table, and/or a forwarding table. As another example, network device 220 may receive an instruction from client device 210 to configure a setting or configuration, such as a port state (e.g., open/closed, ingress/egress, etc.) of a port 445 of network device 220, filter settings, and/or the like. In some implementations, network device 220 may receive the instruction based on input from a user of client device 210, periodically, according to a schedule, and/or the like. In some implementations, network device 220 may receive the instruction by generating the instruction.

In some implementations, the state of the data plane may determine the manner in which network device 220 handles a packet. For example, the state of the data plane may determine a manner in which a packet received by network device 220 is to be transferred, forwarded, trapped, filtered, or dropped. In some implementations, when validating the data plane, network device 220 may use a result of the manner in which network device 220 handled the packet to validate the data plane, as described in more detail below.

In some implementations, network device 220 may receive the instruction to configure a state from another device (e.g., configuration information identifying a virtual local area network (VLAN) or an Internet protocol (IP) address to be used to transfer, filter, or drop a packet). For example, a user of client device 210 may use a command-line interface or an application program interface (API) to provide the state and/or information identifying the state to network device 220. In some implementations, network device 220 may provide information for display (e.g., via a display of client device 210) indicating that the state has been configured on network device 220 to verify the configuration of the state on network device 220. Additionally, or alternatively, network device 220 may provide information for display indicating that a particular combination of software and/or applications have been configured on network device 220.

In some implementations, network device 220 may configure a physical component or a hardware component of network device 220 (e.g., prior to validating the data plane of network device 220). In some implementations, when configuring a physical component or a hardware component of network device 220, network device 220 may configure port 445. For example, prior to validating a state of a data plane of network device 220, network device 220 may configure a loopback on port 445 (e.g., a MAC loopback, a physical layer (PHY) loopback, a serializer/deserializer (SerDes) loopback, or an electronic loopback). This reduces or eliminates the need for an optical transceiver to be connected to network device 220 during validation of the data plane. To configure a loopback on a port 445, network device 220 may configure the port 445 to move a packet from an egress queue to an ingress queue to emulate the transmission (from the egress queue) and reception of the packet (to the ingress queue).

In some implementations, network device 220 may configure ports 445 that are not being used to validate the data plane of network device 220. For example, network device 220 may configure a loopback on ports 445 not being used to validate the data plane of network device 220 (e.g., to prevent a packet from being sent via an incorrect port 445 during validation).

In some implementations, when configuring a physical component or a hardware component of network device 220, network device 220 may configure a trap on port 445. For example, network device 220 may configure an ingress trap on ports 445 that are not to be used as ingress ports when validating the data plane of network device 220. In some implementations, network device 220 may configure the trap by configuring a setting of port 445 and/or network device 220, such as by configuring a ternary content-addressable memory (TCAM), a filter rule, and/or the like. In some implementations, network device 220 may use the trap to trap a packet to ASIC 435, CPU port 440, or a CPU of network device 220, as described in more detail below.

In some implementations, when configuring a physical component or a hardware component of network device 220, network device 220 may configure a physical component or a hardware component to have a bypass inject capability. For example, network device 220 may configure ASIC 435 and/or CPU port 440 to have a bypass inject capability (e.g., set a value of a bypass inject configuration identifier to true).

In some implementations, configuring a bypass inject capability may enable the physical or hardware component to inject, or provide, a packet (e.g., generated by traffic generator 415) directly to a queue, such as an ingress or egress queue, a transmit or receive queue, or the like, of port 445, such as to simulate ingress or egress of the packet, as described in more detail below. For example, configuring a bypass inject capability may enable network device 220 to provide a packet provided via a particular tap 430 to an egress, or transmit, queue of a corresponding port 445.

In some implementations, network device 220 may perform a test related to a data plane of network device 220 based on configuring network device 220. In some implementations, a test may include a test to validate a data plane of network device 220 (e.g., to validate the manner in which network device 220 handles the packet based on a state of the data plane). For example, a test may include parameters, such as a state (S) of a data plane and a flow (f) of a set of packets (e.g., line rate traffic, a packet stream, etc.). In some implementations, a test, or the parameters of a test, may be represented by an equation or a formula. For example, the test may be represented by the equation:

$$f = (pkt, p, \text{rate}, du, dir) \forall \begin{cases} pkt \in \text{Any Flow} \\ p \in \text{(All Front Panel ports)} \\ (0 < \text{rate} \le \text{LineRate}) \\ du \in \text{(Duration)} \\ dir \in [\text{In} \mid \text{Out}] \end{cases} \quad (1)$$

In equation 1, the term f may represent a flow of packets related to network device 220 and may be identified by the tuple (pkt, p, rate, du, dir). Continuing with equation 1, the term pkt may represent the set of packets that is an element of (e.g., ∈) any flow of packets, the term p may represent a port of network device 220, such as a port that is an element of any port on a front panel of network device 220, the term rate may represent a rate at which the set of packets (pkt) are being received via a port (p) of network device 220, where the rate is greater than zero and less than or equal to a particular line rate, the term du may represent a duration (e.g., an amount of time or a time period) that the set of packets (pkt) are being received via the port (p), and the term dir may represent a direction (e.g., in/out, ingress/egress, or inflow/outflow) that the set of packets (pkt) are traveling (e.g., flowing). Continuing still with equation 1, the term ∀ may represent a universal quantification logical operator. The term ∀ is shown in other equations below and may have the same meaning.

In some implementations, a set of flows of packets (F) (e.g., a set of all possible flows of packets) may be represented by another equation or formula. For example, the set of flows of packets may represented by the equation:

$$F = \{f\} = \{pkt \times p \times \text{rate} \times du \times dir\} \quad (2)$$

In equation 2, the term F may represent a set of flows of packets for a given system. Continuing with equation 2, the term {f} may represent the Cartesian product of all possible flows for a given system (e.g., {pkt×p×rate×du×dir}). In some implementations, a set of flows (F) may be grouped into ingress flows ($F_i$) and egress flows ($F_o$). In some implementations, ingress flows ($F_i$) may be represented by an equation or a formula. For example, ingress flows ($F_i$) may be represented by the equation:

$$F_i = F(dir = \text{In}) \subset F \quad (3)$$

In equation 3, the term F(dir=In) may represent a set of flows, where the direction of the flow of packets is into network device 220 (e.g., dir=In). Continuing with equation 3, $F_i$ may represent a subset of all possible flows of packets (e.g., represented by the term ⊂F).

In some implementations, egress flows ($F_o$) may be represented by an equation or a formula. For example, egress flows ($F_o$) may be represented by the equation:

$$F_o = F(dir = \text{Out}) \subset F \quad (4)$$

In equation 4, the term F(dir=Out) may represent a set of flows, where the direction of the flow of packets is out of network device 220 (e.g., represented by the term dir=Out). Continuing with equation 4, $F_o$ may represent a subset of all possible flows of packets (e.g., $\subset F$).

In some implementations, a test may be based on input to the test (e.g., a flow (f) and a state (S)). For example, the input for the test may include a set of ingress flows. In some implementations, input for a test may be represented by an equation or a formula. For example, input for a test may be represented by the equation:

$$T_i^a = (S, F_i^a) \forall \begin{cases} F_i^a = \text{the ingress flow set for test case} \\ S = \text{State of the } DataPlane \end{cases} \quad (5)$$

In equation 5, the term $T_i^a$ may represent input for a test $T^a$. Continuing with equation 5, the term $(S, F_i^a)$ may represent parameters of the input $T_i^a$ of test $T^a$, where the term S may represent a state of a data plane of network device 220 and the term $F_i^a$ may represent a set of ingress flows (e.g., a subset of all possible flows of packets).

In some implementations, output of a test may be represented by an equation or a formula. For example, output for a test may be represented by the equation:

$$T_o^a = (F_o^a, \Delta S) \forall \begin{cases} F_o^a = \text{is the output flow set for } T_i^a \\ \Delta S = \text{Expected Differential} \\ \text{change in Data plane state} \end{cases} \quad (6)$$

In equation 6, the term $T_o^a$ may represent output of a test $T^a$. Continuing with equation 6, the term $(F_o^a, \Delta S)$ may represent parameters of the output $T_o^a$ of test $T^a$, where the term $F_o^a$ may represent a set of egress flows for (e.g., related to or based on) the set of ingress flows $F_i^a$ input into test $T^a$ and where the term $\Delta S$ may represent an expected change in a state (e.g., a counter state, a buffer state, a policer state, or a shaper state) of a data plane of network device 220.

To summarize, a test may include input to the test and output from the test. In some implementations, this may be represented by an equation or a formula. For example, the test may be represented by the equation:

$$T^a = T_i^a + T_o^a \quad (7)$$

In equation 7, the term $T^a$ may represent a test of a data plane of network device 220, the term $T_i^a$ may represent input to the test $T^a$ and the term $T_o^a$ may represent output from test $T^a$.

In some implementations, a test may be associated with a particular type of test. For example, a test may be associated with a functionality test, where a single ingress packet is used to test data path functionality, as described herein with respect to FIG. 5. As another example, a test may be associated with a congestion test, where multiple ingress packets are used to test packet rate specific features or states of the data plane of network device 220, such as to test a learn rate, queue/port bandwidth, buffer usage, replication rate, and/or the like, as described in more detail herein with respect to FIG. 6. In some implementations, a set of ingress/egress flows for a particular type of test may be represented by an equation. For example, a set of ingress flows for a functionality test may be represented by the equation:

$$T^f \subset T \forall F_i^f \subset F_i(\text{rate}=1, du=1) \quad (8)$$

In equation 8, the term $T^f$ may represent a functionality test and the term $\subset T$ may represent that test $T^f$ is a subset of all possible tests T. Continuing with equation 8, the term $F_i^f$ may represent a set of ingress flows used for test $T^f$ and the term $\subset F_i(\text{rate}=1, \text{dur}=1)$ may represent that ingress flow $F_i^f$ is a subset of all ingress flows $F_i$, where the rate (rate) of the ingress flows is one packet (=1) and the duration (du) is one time period (=1).

In some implementations, a test may be divided into subtests. For example, a test may be divided into subtests associated with different ingress flows used for the test. In some implementations, a relationship between a test and subtests may be represented by an equation or a formula. For example, the relationship between a test and subtests for each ingress flow may be represented by the equation:

$$T^f = \sum_{n=1}^{m} \Delta T_n^f \forall m \in \left(0 < m \leq n(F_i^f)\right) \quad (9)$$

In equation 9, the term $T^f$ may represent a functionality test that uses a single packet ingress flow. Continuing with equation 9, the term $\Delta T_n^f$ may represent a change in a particular ingress flow $F_i^f$ used for test $T^f$, the term $n(F_i^f)$ may represent a quantity of ingress flows being used during the test, the term $m \in (0 < m \leq n(F_i^f))$ may represent that m, an upper bound of the summation of tests for each ingress flow, is included in a range of numbers, where m is greater than zero and less than or equal to the quantity of ingress flows being used, and the term n may represent a lower bound of the summation. Continuing with equation 9, functionality test $T^f$ may equal a summation of changes in ingress flows (e.g., represented by the term $\Sigma_{n=1}^{m} \Delta T_n^f$).

Applying the above described equations to a functionality test that includes one packet on one ingress flow, the functionality test may be represented by equation 10 (e.g., which applies equation 9 to a single packet, single ingress flow test):

$$T^f = T^f(m=1) = \Delta T_1^f \quad (10)$$

In equation 10, the term $T^f$ may represent the functionality test that uses a single packet and a single ingress flow and the term $\Delta T_1^f$ may represent a change in a single ingress flow $T_1^f$. Further applying the above described equations to functionality test $T^f$, the set of ingress flows used for test $T^f$ may be represented by equation 11:

$$F_i^f = \{(pkt, p=IP_1, \text{rate}=1, du=1, dir=\text{IN})\} \quad (11)$$

In equation 11, $IP_1$ may represent any ingress port of network device 220. Further applying the above described equations to functionality test $T^f$, the input parameters for the test may be represented by equation 12 (e.g., which applies equation 5 to test $T^f$):

$$T_i^f = (S, F_i^f) \quad (12)$$

In equation 12, the term $T_i^f$ may represent input parameters to functionality test $T^f$ (e.g., a state (S) of the data plane of network device 220 and a set of ingress flows ($F_i^f$). Further applying the above described equations to functionality test $T^f$, the output parameters of functionality test $T^f$ may be represented by equation 13 (e.g., which applies equation 6 to functionality test $T^f$):

$$T_o^f = (F_o^f, \Delta S) \quad (13)$$

In equation 13, the term $\Delta S$ may represent an expected change in the state of the data plane of network device 220 during functionality test $T^f$ (e.g., a change in a packet count value, a byte count value, a drop count value, or a filter count value) and the term $F_o^f$ may represent a set of egress flows for functionality test $T^f$. Further applying the above described equations to functionality test $T^f$, the input and output of functionality test $T^f$ may be represented by equation 14 (e.g., which applies equations 7, 12, and 13):

$$T^f = T_i^f + T_o^f \qquad (14)$$

In equation 14, functionality test $T^f$ may include input parameters $T_i^f$ and output parameters $T_o^f$.

In this way, network device 220 may be configured in a manner that permits validation of a data plane of network device 220. As described herein with respect to process 500, when validating the data plane of network device 220, network device 220 may perform a test, such as a functionality test, that includes use of a single packet to validate the data plane. Another type of test, such as a congestion test, that includes use of multiple packets to validate the data plane is described in more detail below with respect to FIG. 6.

As further shown in FIG. 5, process 500 may include providing a packet from a traffic generator to a first port representing an ingress port of the network device (block 520). For example, network device 220 may provide a packet (e.g., a network packet) from traffic generator 415 to a particular port 445. In some implementations, network device 220 may use test orchestration software 420 to provide a packet from traffic generator 415 to port 445.

In some implementations, network device 220 may generate a packet (e.g., prior to providing the packet to port 445). For example, network device 220 may use test orchestration software 420 to cause traffic generator 415 to generate the packet. In some implementations, network device 220 may generate a packet that satisfies a set of specifications (e.g., a set of specifications related to the state of the data plane being tested). For example, network device 220 may generate a packet that includes information identifying a particular source or destination port, a particular protocol (e.g., Internet protocol (IP), address resolution protocol (ARP), transmission control protocol (TCP), user datagram protocol (UDP), etc.), a particular source or destination IP address, and/or the like. In some implementations, network device 220 may generate a packet based on information identifying the set of specifications, such as information received from, or input by a user of, client device 210.

In some implementations, network device 220 may provide a generated packet from traffic generator 415 to tap 430. For example, network device 220 may use test orchestration software 420 to cause traffic generator 415 to provide a generated packet from traffic generator 415 to tap 430. In some implementations, network device 220 may use a bypass inject capability to provide (e.g., inject) the packet from traffic generator 415 to tap 430.

In some implementations, network device 220 may provide the packet from tap 430 to port 445. For example, network device 220 may provide the packet from a particular tap 430 to a corresponding port 445 (e.g., via ASIC 435 and/or CPU port 440). In some implementations, network device 220 may use test orchestration software 420 to provide the packet from tap 430 to port 445. In some implementations, when providing the packet from tap 430 to port 445, network device 220 may use a bypass inject capability to provide the packet directly to an egress or transmit queue of port 445.

In this way, network device 220 may use virtual components, such as traffic generator 415 and/or tap 430, to emulate generation and/or transmission of a packet by a physical device, such as a physical traffic generator.

As further shown in FIG. 5, process 500 may include looping back the packet at the first port (block 530). For example, network device 220 may use a loopback configured on a first port 445 to loop back the packet at the first port 445, thereby preventing egress of the packet from network device 220. In some implementations, looping back the packet at port 445 may enable network device 220 to emulate ingress of the packet. For example, looping back the packet, generated by traffic generator 415, may enable network device 220 to emulate ingress of the packet from a physical traffic generator connected to network device 220.

In this way, network device 220 may use components of network device 220, such as port 445 configured with a loopback, to emulate ingress of a packet generated by a physical traffic generator.

As further shown in FIG. 5, process 500 may include providing the packet toward a second port representing an egress port of the network device (block 540). For example, network device 220 may provide the packet from the first port 445 of network device 220 toward a second port 445 of network device 220. In some implementations, network device 220 may provide the packet from the first port 445 toward the second port 445 via a packet pipeline. Additionally, or alternatively, network device 220 may use test orchestration software 420 to provide the packet from the first port 445 toward the second port 445.

In some implementations, when providing the packet toward the second port 445, network device 220 may determine an action to perform with respect to the packet. For example, network device 220 may use a rule, policy, or the like, to filter, forward, drop, transfer, etc. the packet. In some implementations, the action that network device 220 determines to perform may be based on a configuration or state of the data plane of network device 220.

In some implementations, network device 220 may provide the packet to the second port 445. For example, network device 220 may provide the packet to the second port 445 based on determining to forward the packet (e.g., to VM 410, such as to emulate forwarding the packet toward a peer network device 220 physically connected to network device 220). In some implementations, when providing the packet to the second port 445, network device 220 may provide the packet to an egress, or transmission, queue of the second port 445 (e.g., to enable emulation of transmission of the packet from network device 220 via the second port 445).

In this way, the data plane of network device 220 may affect a manner in which network device 220 handles a packet generated by traffic generator 415, similar to what would occur if network device 220 had received the packet from a traffic generator physically connected to network device 220.

As further shown in FIG. 5, process 500 may include looping back the packet at the second port (block 550). For example, network device 220 may use a loopback configured on the second port 445 to loop back the packet at the second port 445, thereby preventing egress of the packet from network device 220. In some implementations, network device 220 may loop back the packet after, or in association with, providing the packet for egress via the second port 445. For example, network device 220 may loop back the packet after providing the packet for egress to emulate egress of the packet from network device 220 toward a peer network device 220, without actually permitting the packet to egress network device 220.

In some implementations, when network device 220 loops back the packet at the second port 445, network device 220 may trap the packet to ASIC 435, CPU port 440, port 445, and/or a CPU of network device 220 (e.g., using an ingress trap). In some implementations, trapping the packet may enable network device 220 to determine which physical or virtual components are to receive the packet (e.g., to preempt any default action that network device 220 might take with respect to a packet being received via port 445). For example, trapping the packet may enable network device 220 to determine whether to provide the packet to device software 425 and/or tap 430. Additionally, or alternatively, trapping the packet may enable network device 220 to further emulate egress of the packet from network device 220 (e.g., by providing, or writing, the packet to a particular tap 430 corresponding to the second port 445). In some implementations, network device 220 may use an identifier (e.g., a notification code) associated with a packet to identify a packet to trap.

In this way, network device 220 may use components of network device 220, such as port 445 configured with a loopback, to emulate egress of a packet from network device 220 toward a peer network device 220 physically connected to network device 220. In addition, this enables device-contained validation of a data plane of network device 220 by enabling network device 220 to validate a manner in which network device 220 handles the packet without permitting the packet to egress from network device 220.

As further shown in FIG. 5, process 500 may include providing the packet to a virtual machine (VM) representing a peer network device of the network device (block 560). For example, network device 220 may provide the packet (e.g., the trapped packet) from port 445 to VM 410. In some implementations, network device 220 may use test orchestration software 420, device software 425, and/or software related to a data plane of network device 220 to provide the packet from port 445 to VM 410.

In some implementations, network device 220 may provide the packet from port 445 to VM 410 via a component of network device 220 (e.g., a physical or virtual component). For example, network device 220 may provide the packet from port 445 to VM 410 via tap 430, ASIC 435, and/or CPU port 440. In some implementations, providing the packet via a component of network device 220 may emulate reception of the packet by a peer network device 220. For example, tap 430 may represent a port of a peer network device 220 physically connected to network device 220 and providing the packet to VM 410 via tap 430, such as by injecting the packet to tap 430, to emulate reception of the packet by the peer network device 220. Continuing with the previous example, when providing the packet via tap 430, network device 220 may provide the packet from the second port 445 to a corresponding tap 430 (e.g., a particular tap 430 mapped to the second port 445, an available tap 430, etc.).

In some implementations, network device 220 may provide the packet to a particular VM 410. In some implementations, network device 220 may provide the packet to a particular VM 410 based on an attribute of the particular VM 410. For example, network device 220 may provide the packet to a particular VM 410 configured with a particular port identifier, a particular IP address, a particular MAC address, and/or the like. In some implementations, network device 220 may provide the packet to a particular VM 410 when an attribute of the particular VM 410 matches an attribute of the packet (e.g., a destination port identifier, a destination IP address, etc. of the packet), such as based on a comparison of information identifying an attribute of VM 410 and information identifying an attribute of the packet. In some implementations, network device 220 may provide the packet to a particular VM 410 based on a state of a data plane of network device 220.

In this way, network device 220 may emulate transmission of a packet to a peer network device 220 physically connected to network device 220 and/or reception of the packet by the peer network device 220 using components of network device 220. This enables device-contained data plane validation.

As further shown in FIG. 5, process 500 may include determining whether the test is associated with a pass status or a fail status (block 570). For example, network device 220 may validate a manner in which network device 220 handled (e.g., forwarded, transferred, trapped, filtered, and/or dropped) the packet. In some implementations, network device 220 may validate the data plane of network device 220 based on determining whether the test is associated with a pass status or a fail status. Additionally, or alternatively, network device 220 may use test orchestration software 420 and/or device software 425 to determine whether the test is associated with a pass status or a fail status.

In some implementations, network device 220 may compare an expected result of a test to a result of the test to determine whether the test is associated with a pass status or a fail status. For example, an expected result may be based on a state of a data plane and/or a configuration of a packet being used to test the data plane. Continuing with the previous example, assume that the state of the data plane is configured with a state such that a packet with a particular destination IP address is to be forwarded to a particular device (e.g., a particular VM 410) configured with the same destination IP address, and further assume that a packet used to test the data plane of network device 220 is configured with the same destination IP address. In this case, the expected result would include network device 220 forwarding the configured packet to the particular VM 410 based on the state of the data plane. Further, when network device 220 determines whether the test is associated with a pass status or a fail status, network device 220 may determine whether the configured packet was forwarded to the device (e.g., whether the expected result occurred).

In some implementations, network device 220 may determine that a test is associated with a pass status when a comparison of an expected result of the test and a result of the test indicates a match. For example, network device 220 may determine that a test is associated with a pass status when network device 220 forwards a packet configured with a particular destination IP address to a particular VM 410 configured with the particular destination IP address based on a forwarding table configured on network device 220 indicating that a packet with the particular destination IP address is to be forwarded to a device configured with the particular destination IP address.

Additionally, or alternatively, network device 220 may determine that a test is associated with a fail status when a comparison indicates a mismatch between an expected result of the test and a result of the test. For example, network device 220 may determine that a test is associated with a fail status when network device 220 does not forward a packet configured with a particular destination IP address to a particular VM 410 configured with the particular destination IP address despite a forwarding table configured on network device 220 indicating that a packet with the particular destination IP address is to be forwarded to a device configured with the particular destination IP address.

In some implementations, network device 220 may perform an action based on determining whether a test is associated with a pass status or a fail status. For example, network device 220 may provide a message for display via client device 210 indicating whether the test is associated with a pass status or a fail status. As another example, network device 220 may perform another test (e.g., to test a different state of a data plane of network device 220, a different feature or function of the data plane of network device 220, etc.). As another example, network device 220 may re-perform a test, such as when the test is associated with a fail status (e.g., to confirm that a failed result was not caused by an error unrelated to the data plane of network device 220).

In some implementations, network device 220 may be configured such that the same port 445 is used as an ingress port and an egress port for the test (referred to with respect to block 570 as ingress/egress port 445). In this case, network device 220 may need to be configured differently to validate a data plane of network device 220. For example, network device 220 may need to select (e.g., designate) a particular port 445 as a network port (referred to with respect to block 570 as network port 445), such as a port 445 different from an ingress/egress port 445. In some implementations, network device 220 may select a network port 445 randomly, based on input from a user of client device 210, based on a set of instructions, and/or the like.

In some implementations, when the same port 445 is used as the ingress and egress port, network device 220 may not configure an ingress/egress port 445 with a loop back. Further, in some implementations, network device 220 may not configure a loop back on a network port 445. In some implementations, network device 220 may need to be configured with a transmission line (e.g., an optical fiber cable or a coaxial cable) that connects an ingress/egress port 445 and a network port 445. For example, network device 220 may cause another device (e.g., a robot) to configure network device 220 with a transmission line (e.g., by sending a message, a command, and/or a set of instructions) to the other device. As another example, a network administrator may configure network device 220 with a transmission line.

In some implementations, network device 220 may further configure network device 220 in a manner similar to that described above. For example, network device 220 may configure a trap on a network port 445. In some implementations, when network device 220 is configured, network device 220 may provide (e.g., inject) a packet from traffic generator 415 to a network port 445. For example, network device 220 may provide a packet in a manner similar to that described above.

In some implementations, network device 220 may provide a packet from a network port 445 to an ingress/egress port 445, where the packet may ingress to network device 220. For example, network device 220 may provide a packet to an ingress/egress port 445 via a transmission line that connects a network port 445 and the ingress/egress port 445. In some implementations, network device 220 may provide the packet for egress via the ingress/egress port 445 (e.g., after the packet ingresses via the ingress/egress port 445). In some implementations, network device 220 may provide the packet to the network port 445 (e.g., via the transmission line), where the packet may ingress to network device 220. In some implementations, when the packet ingresses to network device 220 via the network port 445, network device 220 may trap the packet (e.g., using an ingress trap configured on the network port 445).

In some implementations, network device 220 may provide the packet from the network port 445 to tap 430, ASIC 435, CPU port 440, and/or a CPU of network device 220 based on, or in association with, trapping the packet. In some implementations, network device 220 may determine whether the test is associated with a pass status or a fail status in a manner similar to that described above based on receiving the packet via the network port 445.

In this way, network device 220 may determine whether a test of a data plane of network device 220 is associated with a pass status or a fail status, thereby enabling network device 220 to validate a data plane of network device 220 using a single packet.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. Although FIG. 5 describes validation of a state of a data plane that causes a packet to be forwarded to a destination, other implementations may relate to validation of a state of a data plane that causes a packet to be dropped, filtered, trapped, and/or the like.

Figure 6:
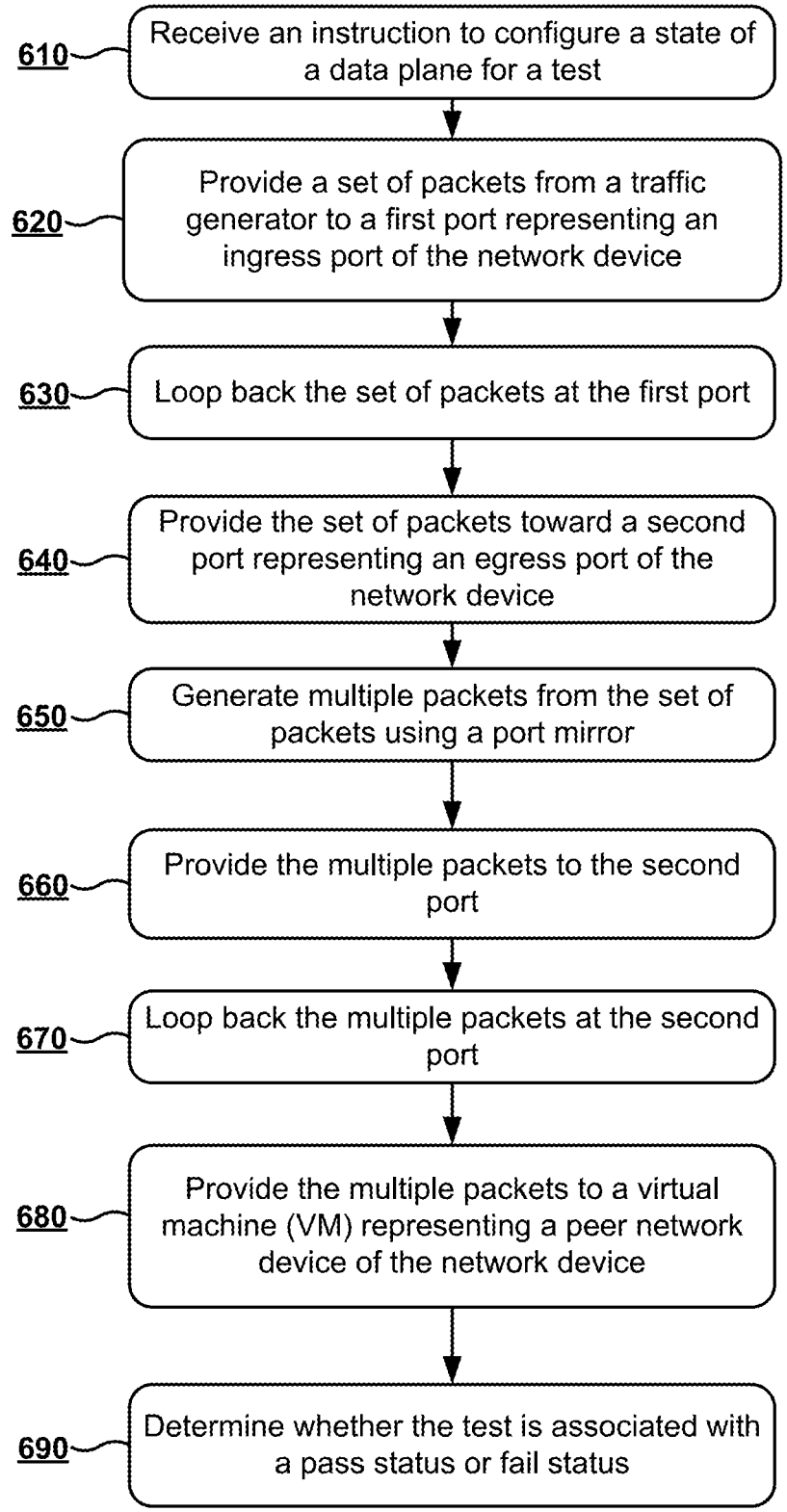
FIG. 6 is a flow chart of an example process for device-contained data plane validation using multiple packets.

FIG. 6 is a flow chart of an example process 600 for device-contained data plane validation using multiple packets. In some implementations, one or more process blocks of FIG. 6 may be performed by network device 220. In some implementations, one or more process blocks of FIG. 6 may be performed by another device or a group of devices separate from or including network device 220, such as client device 210.

As shown in FIG. 6, process 600 may include receiving an instruction to configure a state of a data plane for a test (block 610). For example, network device 220 may receive the instruction in a manner similar to that described above with respect to FIG. 5.

In some implementations, network device 220 may configure a component of network device 220. In some implementations, network device 220 may configure a component of network device 220 in a manner similar to that described above with respect to FIG. 5. For example, network device 220 may configure a component of network device 220 with loopback, a bypass inject, and/or a trap, in a manner similar to that described above. Additionally, or alternatively, network device 220 may configure in a manner different from that described above with respect to FIG. 5. For example, network device 220 may configure a port mirror (e.g., an ingress port mirror) on a particular port 445 used as an ingress port for a test, such as to mirror, copy, or replicate a set of packets (e.g., a flow or stream of packets) received via the particular port 445.

As another example, network device 220 may configure a firewall (e.g., an ingress or egress firewall) and/or a controlled packet sampling/mirror capability to modify and/or evaluate a set of packets. As another example, network device 220 may configure a capability that enables network device 220 to assign an identifier, such as a custom reason code, to a set of packets to identify a reason network device 220 performed an action with respect to the set of packets. As another example, network device 220 may configure a packet buffer (e.g., a dedicated set of packet buffers) for a port 445, such as a particular port 445 used as an ingress port. Configuring a packet buffer may enable network device 220 to prevent packet generation from congesting network device 220 (e.g., affecting a congestion state of network device 220).

In some implementations, network device 220 may be configured to provide a set of packets from a first port 445 to a second port 445 via a packet pipeline, despite the use of a port mirror or another configuration of network device 220. Additionally, or alternatively, network device 220 may be configured to provide a set of packets to port 445 (e.g., an ingress port) at a threshold line rate. In some implementations, network device 220 may be configured to provide different sets of packets for different flows of packets (e.g., differently configured sets of packets, sets of packets at different flow rates, etc.).

In some implementations, network device 220 may perform a test. For example, network device 220 may perform a test after, or in association with, configuring network device 220. In some implementations, network device 220 may perform a different type of test than what was described with respect to FIG. 5. For example, network device 220 may use multiple packets to perform a congestion test, that tests a state and/or a feature of a data plane related to a line rate of packets (e.g., rather than performing a functionality test using a single packet). In some implementations, the test may be represented by an equation or a formula. For example, the test may be represented by the equation:

$$T^c \subset T - T^f \quad (15)$$

In equation 15, the term $T^c$ may represent congestion tests and the term $\subset T - T^f$ may represent that $T^c$ is a subset of all possible tests (T) and that $T^c$ does not include functionality tests ($T^f$). In addition, with respect to the equations described above, the rate of the test may have a value greater than one (e.g., rather than a value of one).

In this way, network device 220 may be configured in a manner that permits validation of a data plane of network device 220. As described herein with respect to process 600, when validating the data plane of network device 220, network device 220 may perform a test, such as a congestion test, that includes use of multiple packets to validate the data plane.

As further shown in FIG. 6, process 600 may include providing a set of packets from a traffic generator to a first port representing an ingress port of the network device (block 620), looping back the set of packets at the first port (block 630), and providing the set of packets toward a second port representing an egress port of the network device (block 640). For example, network device 220 may provide the set of packets to a first port 445, loop back the set of packets at the first port 445, and/or provide the set of packets toward a second port 445 in a manner similar to that described above with respect to FIG. 5. In some implementations, network device 220 may generate a set of packets and may provide (e.g., inject) the set of packets to a particular tap 430 that corresponds to port 445 being used as the ingress port for the test. In some implementations, the set of packets may correspond to $F_i^f$, as described above.

In this way, network device 220 may emulate ingress of a set of packets to network device 220 without using physical devices that are external to network device 220.

As further shown in FIG. 6, process 600 may include generating multiple packets from the set of packets using a port mirror (block 650) and providing the multiple packets to the second port (block 660). For example, network device 220 may mirror, copy, or replicate the set of packets using a port mirror to generate multiple mirrored packets and may provide the set of packets and the multiple mirrored packets to the second port 445. In some implementations, network device 220 may use the port mirror to mirror a set of packets that network device 220 has provided from the first port 445 toward the second port 445 via a packet pipeline.

In some implementations, network device 220 may provide the multiple packets back toward the first port 445 (e.g., prior to providing the multiple packets to the second port 445). In some implementations, network device 220 may loop back the multiple packets at the first port 445. For example, network device 220 may loop back the multiple packets in a manner similar to that described elsewhere herein. In some implementations, network device 220 may continue to mirror packets, provide the mirrored packets to the first port 445, and/or loop back the mirrored packets at the first port 445 until a threshold, or particular, line rate, wire-speed, flow rate, bit rate, or the like is satisfied, or reached. In other words, in some implementations, block 650 may include repeatedly returning to block 630.

In some implementations, a test may need a line rate that is less than a bit rate, or bandwidth, of a connection between a first port 445 and a second port 445. In this case, network device 220 may apply a traffic, or packet, shaper to the set of packets being received via the first port 445 to delay the set of packets until the desired line rate is reached. In some implementations, a test may need different flows of packets to have different line rates. For example, a test may need a first flow of packets to have a first line rate and a second flow of packets to have a second line rate different from the first line rate. In this case, network device 220 may use a firewall filter (e.g., an egress firewall filter) configured with a traffic shaper for each flow of packets to modify the line rates of the different flows of packets.

In some implementations, a total line rate of a set of flows of packets, such as expected egress flows (e.g., $T_o^f$), may exceed a bandwidth of CPU port 440. In this case, in some implementations, network device 220 may use a firewall (e.g., an ingress firewall) configured with a set of rules for each flow of the set of flows. In addition, network device 220 may use a counter for the set of rules, such as to validate line rate-related features of a data plane of network device 220. Further, network device 220 may trap, or sample, packets from each of the set of flows (e.g., randomly, based on a set of rules, etc.) and may provide the trapped packets to device software 425, a network interface controller (NIC), and/or another component of network device 220 for validation of content-related features of a data plane of network device 220. Additionally, or alternatively, network device 220 may use the sampled flow (sFLOW) standard to validate line rate-related features and/or content-related features of a data plane of network device 220.

In this way, network device 220 may generate a flow of packets at a particular line rate and provide the flow of packets to port 445, such as to validate a line rate-related state of a data plane of network device 220.

As further shown in FIG. 6, process 600 may include looping back the multiple packets at the second port (block 670), providing the multiple packets to a virtual machine (VM) representing a peer device of the network device (block 680), and determining whether the test is associated with a pass status or fail status (block 690). For example, network device 220 may loop back the multiple packets and/or provide the multiple packets to VM 410 in a manner similar to that described above with respect to FIG. 5. In some implementations, network device 220 may determine whether the test is associated with a pass status or a fail status in a manner similar to that described above with respect to FIG. 5.

In some implementations, network device 220 may determine whether the test is associated with a pass status or a fail status in a different manner. For example, a test may be associated with a pass status or a fail status based on a manner in which network device 220 handles a flow of packets (e.g., the multiple packets at a line rate). Continuing with the previous example, network device 220 may determine that a test is associated with a pass status when a data plane of network device 220 handles a flow of packets by dropping a threshold quantity of packets (e.g., based on congestion). Alternatively, and continuing with the previous example, network device 220 may determine that a test is associated with the fail status when a data plane of network device 220 handles a flow of packets by dropping a different threshold quantity of packets (e.g., based on congestion).

In some implementations, a single port 445 may be used for ingress and egress functionality during a test. In this case, the test may need to be conducted as described above with respect to FIG. 5.

In this way, network device 220 may determine whether a test of a data plane of network device 220 is associated with a pass status or a fail status, thereby enabling network device 220 to validate a data plane of network device 220 using a multiple packets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. Although FIG. 6 describes validation of a state of a data plane that causes multiple packets to be forwarded to a destination, other implementations may relate to validation of a state of a data plane that causes multiple packets to be dropped, filtered, trapped, and/or the like. Further, although FIGS. 5 and 6 describe validation of a data plane, implementations described herein may be used to validate a control plane of a network device.

Implementations described herein, enable a network device to perform device-contained data plane validation (e.g., without being physically connected to other devices that would otherwise be used to validate the data plane). This reduces or eliminates a need for external devices to be connected to the network device during data plane validation, such as an external traffic generator, a peer network device, an optical transceiver, and/or the like. This conserves resources related to network infrastructure, by reducing or eliminating the need for a network administrator to configure a physical network topology to test the data plane of a network device. Additionally, this improves an efficiency of validating a data plane of a network device.

In addition, implementations described herein may enable the network device to determine, or set, a state for a data plane, such as a state to be used for a data plane test. Further, implementations may enable network device 220 to generate and validate traffic on a set of ports of the network device (e.g., single packet traffic, multiple packet traffic, different flows of traffic at different line rates, etc.). This enables the network device to validate different aspects of a data plane of the network device using device-contained data plane validation, thereby improving validation of the data plane.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive an instruction to configure a state of a data plane to test the state of the data plane using a set of components of the device;
provide a set of packets from a first virtual component of the device to a first port of the device,
the first virtual component including a first virtual representation of a first device,
the first virtual component being included in the set of components, and
the set of packets being provided via a tap interface associated with the first virtual component and the first port to emulate reception of the set of packets from a source external to the device;
loop back the set of packets at the first port of the device based on providing the set of packets to the first port;
perform an action based on the state of the data plane in association with looping back the set of packets at the first port; and
determine whether a test of the state of the data plane is associated with a pass status or a fail status based on packet flow, where the test is associated with a pass status when the data plane handles the packet flow by dropping a threshold quantity of packets from the set of packets.

2. The device of claim 1, where the one or more processors, when performing the action, are to:
provide the set of packets toward a second port of the device;
loop back the set of packets at the second port; and
provide the set of packets to a second virtual component of the device,
the second virtual component including a second virtual representation of a second device,
the second virtual component being included in the set of components.

3. The device of claim 2, where the tap interface is a first tap interface, and
where the one or more processors, when providing the set of packets to the second virtual component, are to:
provide the set of packets from the second port to the second virtual component via a second tap interface associated with the second virtual component and the second port.

4. The device of claim 2, where the one or more processors are further to:
use a trap associated with the second port to trap the set of packets; and
where the one or more processors, when providing the set of packets from the second port to the second virtual component, are to:
provide the set of packets from the second port to the second virtual component based on trapping the set of packets.

5. The device of claim 1, where the one or more processors, when performing the action, are to:
generate multiple packets from the set of packets using a port mirror associated with the first port;
provide the multiple packets toward a second port based on generating the multiple packets;
loop back the multiple packets at the second port; and
provide the multiple packets to a second virtual component of the device,
the second virtual component including a second virtual representation of a second device.

6. The device of claim 1, where the one or more processors are further to:
determine an expected result of the test based on the state of the data plane,
the expected result including:
forwarding a packet to a particular virtual machine configured with a particular destination address, or dropping the threshold quantity of packets;
compare the expected result and a result of the test based on determining the expected result of the test; and
where the one or more processors, when determining whether the test is associated with the pass status or the fail status, are to:
determine whether the test is associated with the pass status or the fail status based on comparing the expected result and the result.

7. The device of claim 1, where the one or more processors are further to:
provide at least one packet of the set of packets to a virtual machine executing on the device,
the virtual machine including another virtual component of the device.

8. A non-transitory computer-readable medium storing instructions, the instructions comprising:
one or more instructions that, when executed by one or more processors, cause the one or more processors to:
receive, from a client device, an instruction to configure a state of a data plane,
the state of the data plane being tested using components of a network device;
provide a packet, from a set of packets, from a traffic generator to a first port of the network device,
the traffic generator including a virtual component of the network device,
the first port of the network device representing an ingress port of the network device, and
the packet being provided via a tap interface associated with the traffic generator and the first port of the network device to emulate reception of the packet from a source external to the network device;
loop back the packet at the first port to emulate ingress of the packet into the network device;
provide the packet toward a second port of the network device to emulate egress of the packet from the network device,
the second port of the network device representing an egress port of the network device;
loop back the packet at the second port;
provide the packet to a virtual machine executing on the network device,
the virtual machine including another virtual component of the network device,
the packet being configured with a destination address associated with the virtual machine; and
determine whether a test of the data plane is associated with a pass status or a fail status based on packet flow,
where the test is associated with a pass status when the data plane handles the packet flow by dropping a threshold quantity of packets from the set of packets.

9. The non-transitory computer-readable medium of claim 8, where the one or more instructions, when executed by the one or more processors, further cause the one or more processors to:
provide information identifying the state to device software of the network device using a component;
provide the information identifying the state to the virtual machine using the component; and
configure the state of the network device and the virtual machine based on providing the information identifying the state to the device software and the virtual machine.

10. The non-transitory computer-readable medium of claim 8, where the one or more instructions, when executed by the one or more processors, further cause the one or more processors to:
trap the packet to an application-specific integrated circuit (ASIC) of the network device, a central processing unit (CPU) of the network device, or a CPU port of the network device; and
where the one or more instructions, that cause the one or more processors to provide the packet to the virtual machine, cause the one or more processors to:
provide the packet to the virtual machine based on trapping the packet.

11. The non-transitory computer-readable medium of claim 8, where the virtual machine is associated with the tap interface, the tap interface to provide the packet from the second port to the virtual machine to emulate delivery of the packet from the network device to a peer network device.

12. The non-transitory computer-readable medium of claim 8, where the one or more instructions, when executed by the one or more processors, further cause the one or more processors to:
provide the packet from the second port to device software via a central processing unit (CPU) port; and
where the one or more instructions, that cause the one or more processors to provide the packet to the virtual machine, are to:
provide the packet to the virtual machine based on providing the packet to the device software.

13. The non-transitory computer-readable medium of claim 8, where the one or more instructions, when executed by the by the one or more processors, are to:
configure a bypass inject associated with the first port; and
where the one or more instructions, that cause the one or more processors to provide the packet from the traffic generator to the first port, cause the one or more processors to:
provide the packet from the traffic generator to the first port using the bypass inject associated with the first port.

14. The non-transitory computer-readable medium of claim 8, where the one or more instructions, when executed by the one or more processors, further cause the one or more processors to:
determine whether the network device provided the packet to the virtual machine based on the state of the data plane; and
where the one or more instructions, that cause the one or more processors to determine whether the test of the data plane is associated with the pass status or the fail status, are to:
determine whether the test of the data plane is associated with the pass status or the fail status based on determining whether the network device provided the set of packets to the virtual machine based on the state of the data plane.

15. A method, comprising:
receiving, by a device, an instruction to configure a state of a data plane of the device,
the state of the data plane being tested by the device using components of the device;
providing, by the device, a set of packets from a traffic generator executing on the device to an ingress port of the device,
the set of packets being provided via a tap interface associated with the traffic generator and the ingress port to emulate reception of the set of packets from a source external to the device;
using, by the device, a first loopback to loop back the set of packets at the ingress port;
generating, by the device, multiple packets from the set of packets using a port mirror associated with the ingress port;
providing, by the device, the multiple packets to an egress port of the device;

using, by the device, a second loopback to loop back the multiple packets at the egress port;
providing, by the device, the multiple packets to a virtual machine executing on the device,
a packet, of the multiple packets, being configured with a destination address of the virtual machine; and
determining, by the device, whether a test of the data plane is associated with a pass status or a fail status based on packet flow,
where the test is associated with a pass status when the data plane handles the packet flow by dropping a threshold quantity of the set of packets.

16. The method of claim 15, further comprising:
providing the set of packets to the port mirror;
copying the set of packets using the port mirror; and
where generating the multiple packets comprises:
generating the multiple packets based on copying the set of packets.

17. The method of claim 15, further comprising:
providing the multiple packets to the ingress port of the device;
using the first loopback to loop back the multiple packets at the ingress port; and
where providing the multiple packets to the egress port further comprises:
providing the multiple packets to the egress port based on using the first loopback to loop back the multiple packets at the ingress port.

18. The method of claim 15, where generating the multiple packets comprises:
generating the multiple packets at a particular line rate, wire-speed, flow rate, or bit rate.

19. The method of claim 15, where generating the multiple packets comprises:
generating the multiple packets for a first test at a first line rate, wire-speed, flow rate, or bit rate; and
generating the multiple packets for a second test at a second line rate, wire-speed, flow rate, or bit rate,
the first line rate, wire-speed, flow rate, or bit rate being different from the second line rate, wire-speed, flow rate, or bit rate.

20. The method of claim 15, where generating the multiple packets comprises:
generating the multiple packets at a particular line rate, wire-speed, flow rate, or bit rate for a first test;
generating the multiple packets at a different line rate, wire-speed, flow rate, or bit rate for a second test using a traffic shaper; and
where providing the multiple packets to the egress port comprises:
providing the multiple packets at the particular line rate, wire-speed, flow rate, or bit rate for the first test; and
providing the multiple packets at the different line rate, wire-speed, flow rate, or bit rate for the second test.

\* \* \* \* \*